United States Patent
Yazici

(10) Patent No.: US 12,552,669 B2
(45) Date of Patent: Feb. 17, 2026

(54) SYSTEM FOR OBTAINING HIGH PURITY NITROGEN IN NITROGEN GAS PURIFICATION APPLICATIONS AND A METHOD THEREOF

(71) Applicant: MIKROPOR MAKINA SANAYI VE TICARET ANONIM SIRKETI, Ankara (TR)

(72) Inventor: Ibrahim Kemal Yazici, Ankara (TR)

(73) Assignee: MIKROPOR MAKINA SANA YI VE TICARET ANONIM SIRKETI, Ankara (TR)

(*) Notice: Subject to any disclaimer, the term of this patent is extended or adjusted under 35 U.S.C. 154(b) by 638 days.

(21) Appl. No.: 18/008,416

(22) PCT Filed: Oct. 16, 2020

(86) PCT No.: PCT/TR2020/050953
§ 371 (c)(1),
(2) Date: Dec. 5, 2022

(87) PCT Pub. No.: WO2021/246984
PCT Pub. Date: Dec. 9, 2021

(65) Prior Publication Data
US 2023/0227310 A1 Jul. 20, 2023

(30) Foreign Application Priority Data
Jun. 5, 2020 (TR) .................................. 2020/08714

(51) Int. Cl.
*C01B 21/04* (2006.01)
*B01J 23/44* (2006.01)

(52) U.S. Cl.
CPC ........... *C01B 21/0494* (2013.01); *B01J 23/44* (2013.01); *C01B 2210/0006* (2013.01); *C01B 2210/0009* (2013.01); *C01B 2210/0042* (2013.01); *C01B 2210/0045* (2013.01); *C01B 2210/0062* (2013.01)

(58) Field of Classification Search
CPC ........ C01B 21/0494; C01B 2210/0006; C01B 2210/0009; C01B 2210/0042; C01B 2210/0045; C01B 2210/0062; C01B 21/0416; B01J 23/44
See application file for complete search history.

(56) References Cited

FOREIGN PATENT DOCUMENTS

| | | | |
|---|---|---|---|
| CN | 106698366 A | 5/2017 | |
| CN | 206751401 U | 12/2017 | |
| KR | 100877511 B1 * | 1/2009 | ......... C01B 21/0422 |
| KR | 100932202 B1 | 12/2009 | |

OTHER PUBLICATIONS

Supplementary English machine translation of KR100932202B1 (Year: 2009).*
Supplementary English machine translation of CN206751401U (Year: 2017).*
International Search Report and Written Opinion for PCT/TR2020/050953; mailing date of Mar. 5, 2021.

* cited by examiner

*Primary Examiner* — Anthony J Zimmer
*Assistant Examiner* — Abdul-Rahman Yusuf Waleed Smari
(74) *Attorney, Agent, or Firm* — Fresh IP PLC; Clifford D. Hyra; Aubrey Y. Chen

(57) ABSTRACT

Disclosed is a system developed for obtaining high purity (minimum 99.999%) nitrogen gas in nitrogen gas purifica-
(Continued)

tion applications and drying obtained nitrogen gas before applying it on areas of use, and to an operating method of the system.

21 Claims, 7 Drawing Sheets

SYSTEM FOR OBTAINING HIGH PURITY NITROGEN IN NITROGEN GAS PURIFICATION APPLICATIONS AND A METHOD THEREOF

FIELD OF THE DISCLOSURE

The disclosure concerns a system developed for obtaining high purity nitrogen gas and drying the resulting high purity nitrogen gas for use in areas of application. The working method of said system is also in the scope of the disclosure.

BACKGROUND

High purity nitrogen gas is used in many areas in the industry. High purity nitrogen gas is mostly provided by means of liquid (cryogenic tanks) and pure nitrogen tanks, and in recent years it has been provided by the use of pressure swing adsorption (PSA) type nitrogen generators and subsequently nitrogen purifier units.

The nitrogen needed for the metal industry, electronics industry and applications demanding high technology, which require high purity nitrogen, can be provided cost-effectively with low air consumption (A/N:3 and lower) by using PSA nitrogen generator and subsequently nitrogen purifier unit.

Obtaining high purity nitrogen gas by the nitrogen purifier unit is based on reacting the oxygen molecules contained in the nitrogen gas with the hydrogen molecules on the catalyst surface, obtaining water and thus reducing the oxygen content in the nitrogen gas below 10 ppm.

In the available systems, nitrogen gas with 99.9% and 99.95% purity is reached to 99.999% purity by using nitrogen purifier unit. In these systems, the temperature within the nitrogen purifier unit is in the range of 50-80° C. as a result of the exothermic reaction occurred. The dew point value at the outlet of the nitrogen purifier unit increases up to 25° C.

Since the gas is not dry, providing the nitrogen gas produced directly to the line causes damage to equipment in applications where nitrogen gas is used. Thus, it is required to remove the water resulting from the reaction occurred inside the nitrogen purifier unit. The use of a dryer after the nitrogen purifier unit ensures that the obtained gas is separated from the water/dried before it is supplied to the application area.

An example of the known state of the art is the patent document KR100877511B1. The document relates to a system that produces high purity nitrogen gas to supply high purity nitrogen gas required in an operation, and freely control the supply amount and supply pressure of nitrogen gas as per working conditions. It is stated that this system comprises an air compressor, an air purification unit, a nitrogen generator, a nitrogen purification unit, a pressure booster unit, a pressure tank and a pressure regulator. It is stated that the air purification unit removes impurities and water in compressed air supplied by the air compressor to purify the compressed air; the nitrogen generator separates and discharges nitrogen gas only from the purified compressed air; the nitrogen purification unit reacts nitrogen gas containing oxygen with hydrogen under a platinum catalyst to increase the purity of the nitrogen gas by removing oxygen contained in the nitrogen gas.

Another example of the known state of the art is the utility model CN2526312Y. The document relates to a purifying device for removing oxygen and water from nitrogen. It is stated that the device of the utility model comprises a hydrogen oxygen retort containing a palladium catalyst, a cooler, a filter, and a retort for alternately absorbing water and heating rebirth, which are arranged in order and used for removing oxygen and also a controller which transfers the absorption.

However, these documents do not mention of a dryer unit and purifier unit being under a single unit, and there is no information on obtaining high purity nitrogen gas from nitrogen gas with a purity less than 99.9% and 99.95%.

In the available systems described above with examples, the dryer is used as a separate unit after nitrogen purifier unit, which is unfavorable in terms of both the area occupied and the usage.

Accordingly, there is still a need for a system with a compact structure which is developed for obtaining high purity nitrogen gas from nitrogen gas with a purity less than 99.9% and 99.95% unlike the state of the art.

SUMMARY

The disclosure concerns a system developed for obtaining high purity nitrogen gas and drying the resulting high purity nitrogen gas for use in areas of application. The working method of said system is also under the scope of the disclosure.

The disclosure relates to a system that is achieved by combining a nitrogen purifier unit and a dryer unit, and used in nitrogen purification applications.

More specifically, in the disclosure, high purity (minimum 99.999%) nitrogen gas is obtained from nitrogen gas with a 99.5% and 99.9% purity.

An object of the disclosure is to provide a large amount of compressed air savings by obtaining high purity (minimum 99.999%) nitrogen gas particularly from nitrogen gas with a 99.5% purity. While the air/nitrogen ratio is 4 or higher in the present purifier systems, the air/nitrogen ratio is 3 or lower in the system of disclosure.

An object of the disclosure is to provide cost savings (air/nitrogen ratio<3) by obtaining high purity (minimum 99.999%) nitrogen gas particularly from nitrogen gas with a 99.5% purity.

Another object of the disclosure is to get a compact system by combining the unit that purifies nitrogen gas, and the dryer unit under a single canopy.

The system of the disclosure mainly comprises a unit that enables the nitrogen gas with a 99.5% and 99.9% purity to have a minimum of 99.999% purity, and a dryer unit that ensures the dew point value to be <3° C. by condensing water formed after the reaction.

The nitrogen gas supplied to the system is provided by a nitrogen generator.

The system of the disclosure comprises, in general;
- a nitrogen inlet port (5) for the inlet of nitrogen gas from a nitrogen generator, which allows connection to the nitrogen generator,
- a catalyst tank (4) containing at least one catalyst, which allows eliminating of the oxygen molecules in the nitrogen gas,
- a hydrogen inlet port (1) for the inlet of hydrogen gas into the said catalyst tank (4),
- at least one solenoid valve (2) for controlling the flow of hydrogen gas entered the catalyst tank (4), and where necessary, closing the inlet of hydrogen gas to the system,
- a hydrogen flowmeter (3) for monitoring the flow of hydrogen gas, at least one proportional valve that allows passing of the hydrogen gas at the correct flow rate, a control unit for setting the flow rate of hydrogen and controlling the temperature, a first cooler (aftercooler) (13) that cools the nitrogen gas and condense the water therein, a water separator (11) for separating the liquid water formed in the nitrogen gas, at least one discharge member and at least one discharge port (16) for discharging the water separated by the water separator (11), a refrigerant type dryer unit, at least one temperature sensor for controlling the temperature, a control system panel (17) for controlling the system and a nitrogen outlet port (9) for the exhaust of high purity nitrogen gas obtained from the system.

In an embodiment of the disclosure, the refrigerant type dryer unit comprises a compressor (18) for compressing refrigerant gas.

In an embodiment of the disclosure, the refrigerant type dryer unit comprises a regulator (14) for setting gas pressure.

In an embodiment of the disclosure, the refrigerant type dryer unit comprises a condenser (21) that allows cooling of compressed hot refrigerant gas.

In an embodiment of the disclosure, the refrigerant type dryer unit comprises an eliminator filter dryer (12) for eliminating harmful particles in the refrigerant fluid.

In an embodiment of the disclosure, the refrigerant type dryer unit comprises a thermostatic expansion valve (6) for cooling the fluid by reducing its pressure.

In an embodiment of the disclosure, the refrigerant type dryer unit comprises an exchanger (8) for heating and cooling the gas. More specifically, the exchanger (8) allows drying of the high purity and moist nitrogen at the outlet of the catalyst tank (4) in the system.

In an embodiment of the disclosure, the exchanger (8) comprises a plurality of plates.

In an embodiment of the disclosure, the exchanger (8) comprises an aluminum plate.

In an embodiment of the disclosure, the exchanger (8) has a high heat transfer area.

In an embodiment of the disclosure, the exchanger (8) has a low pressure drop.

In an embodiment of the disclosure, the control unit is a PID control unit.

In an embodiment of the disclosure, there are at least two discharge members. In an embodiment, the discharge member is an egg-shaped discharge (10) member.

In an embodiment of the disclosure, there are at least two egg-shaped discharge (10) members.

In an embodiment of the disclosure, there are two egg-shaped discharge (10) members.

In an embodiment of the disclosure, there is an oxygen analyzer (7) for measuring purity of nitrogen gas.

In an embodiment of the disclosure, there is a dew point analyzer (15) for measuring dryness of nitrogen gas.

In an embodiment of the disclosure, the first cooler (aftercooler) (13) and condenser (21) are contained in a single body.

In an embodiment of the disclosure, the system and all the analyzers, valves and sensors on the system are controlled by the control system panel (17).

In an embodiment of the disclosure, the unit providing nitrogen purification and the dryer unit are contained under a single unit within the system. In other words, the catalyst tank (4) and the dryer unit has a single canopy.

In an embodiment of the disclosure, it comprises a housing (19) surrounding the system. On the housing (19), there is a plurality of openings for the inlet and outlet of nitrogen and hydrogen gas.

In an embodiment, the disclosure comprises a connection cable (20) on the housing (19) that allows driving of energy required for the operation of the system.

In an embodiment of the disclosure, at least two surfaces of the housing (19) have a perforated structure for allowing air inlet and outlet.

In an embodiment of the disclosure, the nitrogen generator is PSA (Pressure Swing Adsorption).

In an embodiment of the disclosure, the catalyst located in the catalyst tank (4) comprises a metal coating. In an embodiment, the metal is palladium.

The working method of the disclosure is based on mixing 1% hydrogen with nitrogen gas that is produced with 99.5% purity and contains 0.5% oxygen, obtaining water and producing nitrogen with 99.999% purity by removing the obtained water by the dryer unit.

The system of the disclosure is operated by placing it in a housing (19). The working principle of the system of disclosure is as follows. Low purity (99.5%) nitrogen gas from the nitrogen generator is provided to the nitrogen purifier unit by means of the nitrogen inlet port (5). Nitrogen gas enters the catalyst tank (4) filled with primarily palladium catalyst in the nitrogen purifier unit. Hydrogen gas set to a desired flow rate by the hydrogen flowmeter (3) is sent into the said catalyst tank (4) to react it with oxygen in the nitrogen gas. Moist nitrogen gas at high temperature exiting from the catalyst tank (4) is cooled by passing it through the first cooler (aftercooler) (13) in the dryer unit. Then the gas is sent to the water separator (11) to separate the liquid water. The nitrogen gas from the water separator (11) is sent to the exchanger (8) comprising a thin aluminum plate to be dried in order to obtain dry nitrogen (<3° C. PdP).

The refrigerant compressor (18) in the dryer unit compresses the cooler in gas form with a higher pressure. The compressed hot gas is sent to the condenser (21) and it is cooled. The resulting refrigerant fluid is passed through an eliminator filter dryer (12) to protect the expansion valve (6) by eliminating harmful particles. After the filtering process, the fluid is transmitted to the thermostatic expansion valve (6) and cooled by reducing its pressure. Then the fluid is transferred to the nitrogen-gas exchanger (8), it turns from liquid to gas form by condensing the water contained in pure nitrogen. The cooling cycle is completed by sending the refrigerant from the nitrogen-gas exchanger (8) to the refrigerant compressor (18) and proceeds as a continuous cycle.

By means of the dryer unit, heat is removed from pure nitrogen, and by cooling it to the desired dew point, high purity (99.999%) dry nitrogen gas is obtained.

In the operations for purifying 99.5% purity nitrogen gas, the temperature in the nitrogen purifier unit within the system of the disclosure may increase up to approximately 80° C. as a result of the reaction. The nitrogen purifier unit allows for a smooth nitrogen (min 99.999% purity) production up to a maximum temperature of 150° C. The dew point value at the outlet of this unit is above 25° C.

Additionally, if the purity within the system decreases down to 99.2%, the flow rate of hydrogen is set by the PID control unit on the system.

In summary, the disclosure is, in general, a system for obtaining high purity nitrogen gas, wherein it comprises a nitrogen inlet port (5) for the inlet of nitrogen gas from the nitrogen generator which provides connection with and is connected to a nitrogen generator, a catalyst tank (4) with at least one catalyst, allowing the removal of oxygen molecules in the nitrogen gas, a hydrogen inlet port (1) for the inlet of hydrogen gas into the said catalyst tank (4), at least one solenoid valve (2) for controlling the flow of hydrogen gas entering the catalyst tank (4), and closing the hydrogen gas inlet to the system, a hydrogen flow meter (3) for monitoring the flow of hydrogen gas, at least one proportional valve that allows the passage of hydrogen gas at the correct flow rate, a PID control unit for setting the flow rate of hydrogen and controlling the temperature, a first cooler (aftercooler) (13) allowing the condensation of water therein by cooling the nitrogen gas, a water separator (11) for separating the liquid water formed in the gas, at least one discharge member and at least one discharge port (16) for discharging the water separated by the water separator (11), a refrigerant type dryer unit, at least one temperature sensor for controlling the temperature, a control system panel (17) for controlling the system and a nitrogen outlet port (9) for the outlet of nitrogen gas from the system.

The working method of the system is also under the scope of the disclosure.

In summary, the working method of the disclosure comprises the steps of

- sending nitrogen gas from a nitrogen generator into the catalyst tank (4),
- sending hydrogen gas set at a desired flow rate into the catalyst tank (4) to react it with oxygen in nitrogen gas,
- cooling nitrogen gas obtained at the outlet of the catalyst tank (4) by sending it to the first cooler (aftercooler) (13), and condensing water contained in it,
- separating the resulting liquid water by means of the water separator (11),
- discharging the water separated by the water separator (11),
- transmitting nitrogen gas from the water separator (11) to the exchanger (8),
- compressing the refrigerant gas by the refrigerant compressor (18),
- cooling compressed gas by sending it to the condenser (21),
- eliminating harmful particles by passing refrigerant fluid through an eliminator filter dryer (12),
- transmitting refrigerant fluid passing through the eliminator filter dryer (12) to the thermostatic expansion valve (6), and cooling it by reducing its pressure,
- transmitting refrigerant fluid to the exchanger (8),
- condensing water contained in the pure nitrogen and turning the refrigerant fluid from liquid to gas form and sending refrigerant gas to the refrigerant compressor (18).

By means of the disclosure, contrary to the present systems in the state of art, savings in terms of air and cost are provided by obtaining high purity gas from low purity (e.g. 99.5%) nitrogen gas, and also a complex structure is provided by combining the unit purifying nitrogen gas and the dryer unit under a single canopy. Therefore, thanks to the disclosure, an efficient system is created in terms of nitrogen purity and usage.

DESCRIPTIONS OF REFERENCE NUMBERS IN FIGURES

Figure 1:
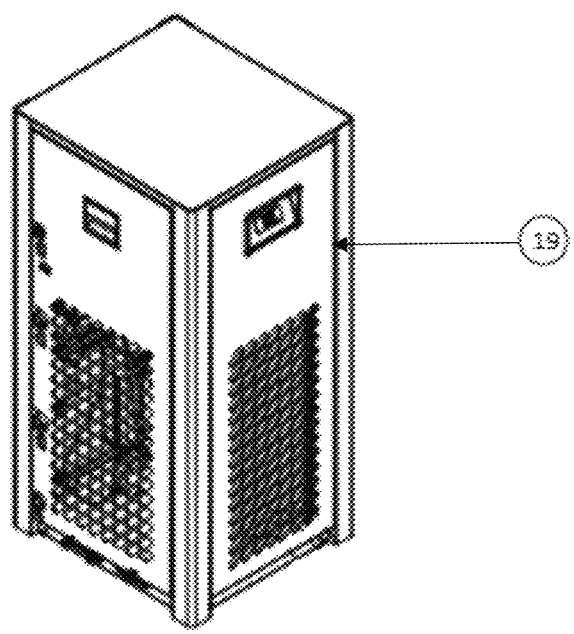
FIG. 1 A View of the System and the Housing (19) of the Disclosure
Figure 2A:
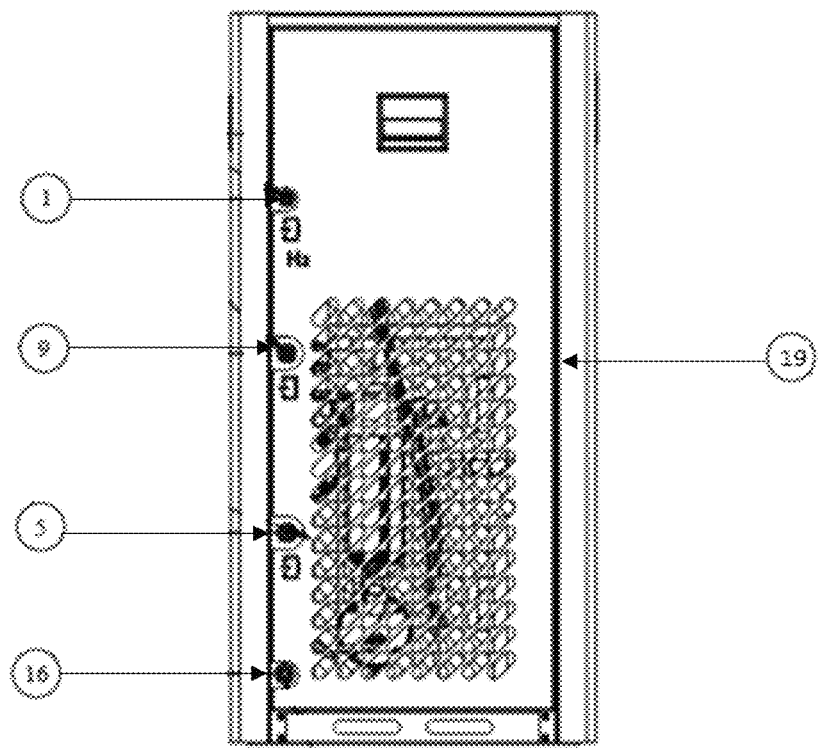
FIG. 2 Views of the System and the Housing (19) of the Disclosure From Different Perspectives FIG. 2a Left Side View of the System and the Housing (19) of the Disclosure FIG. 2b Upper View of the System and the Housing (19) of the Disclosure FIG. 2c Frontal View of the System and the Housing (19) of the Disclosure FIG. 2d Bottom View of the System and the Housing (19) of the Disclosure FIG. 2e Right Side View of the System and the Housing (19) of the Disclosure FIG. 2f Back View of the System and the Housing (19) of the Disclosure FIG. 3 Another View of the System and the Housing (19) of the Disclosure FIG. 4 Detailed View of the System of the Disclosure from Different Perspectives FIG. 5 A Detailed Side View of the System of the Disclosure FIG. 6 A View of the Catalyst Tank (4) in the System of the Disclosure
Figure 2B:
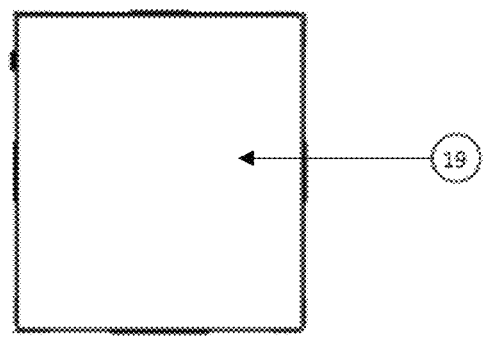
Figure 2C:
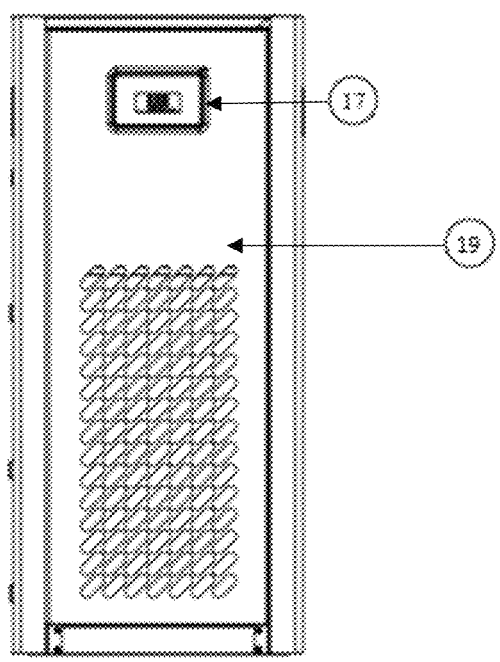
Figure 2D:
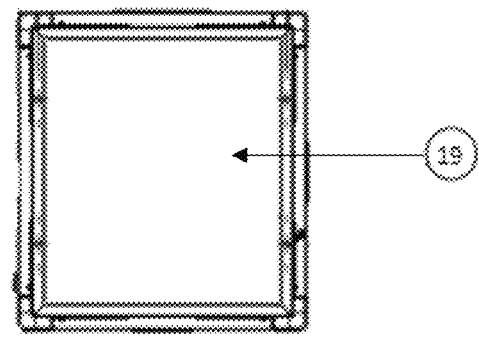
Figures 2E, 2F:
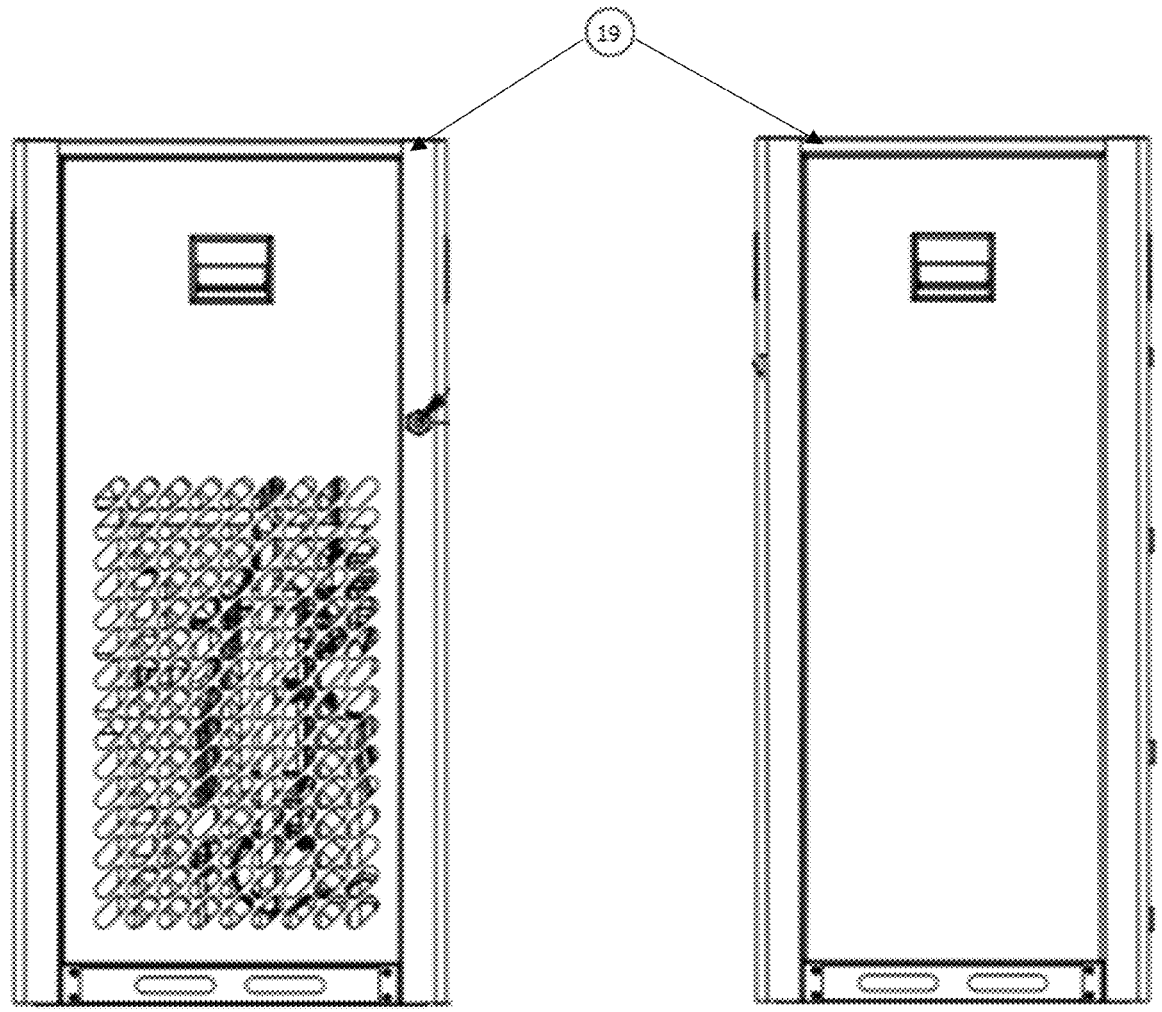
Figure 3:
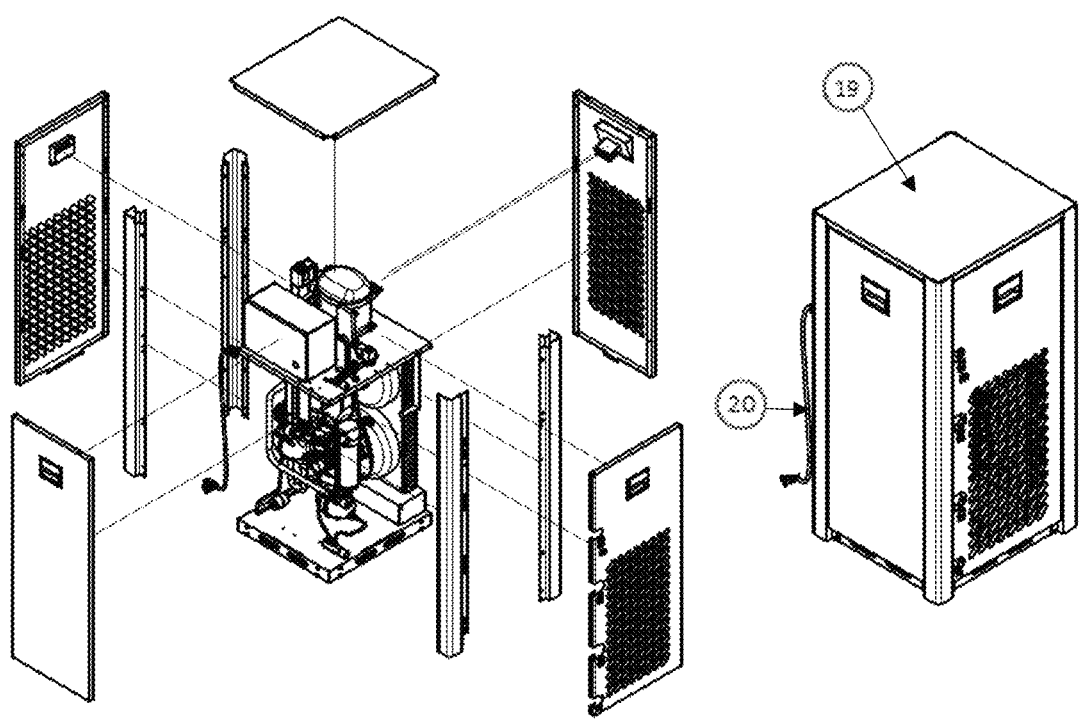
Figure 4:
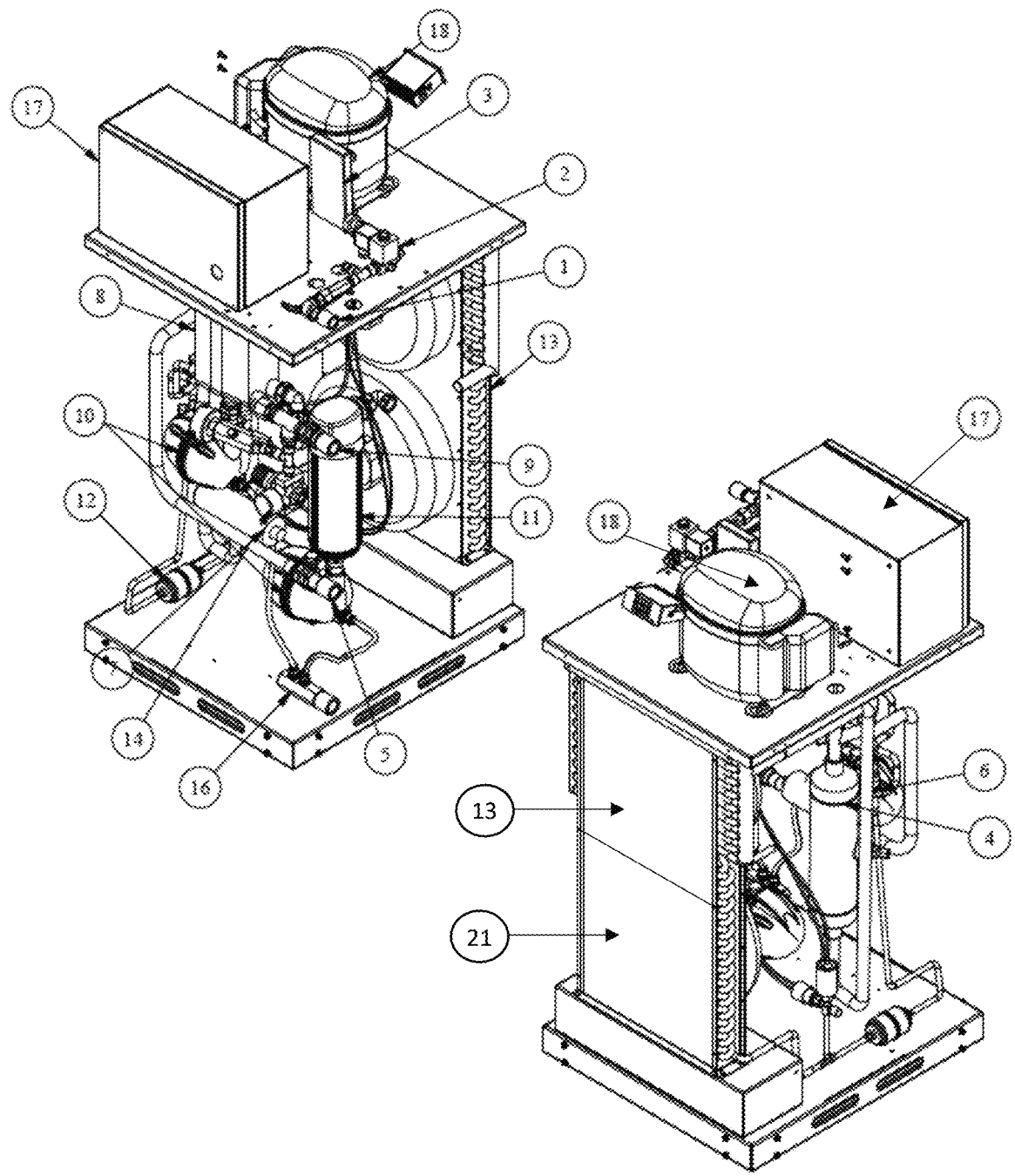
Figure 5:
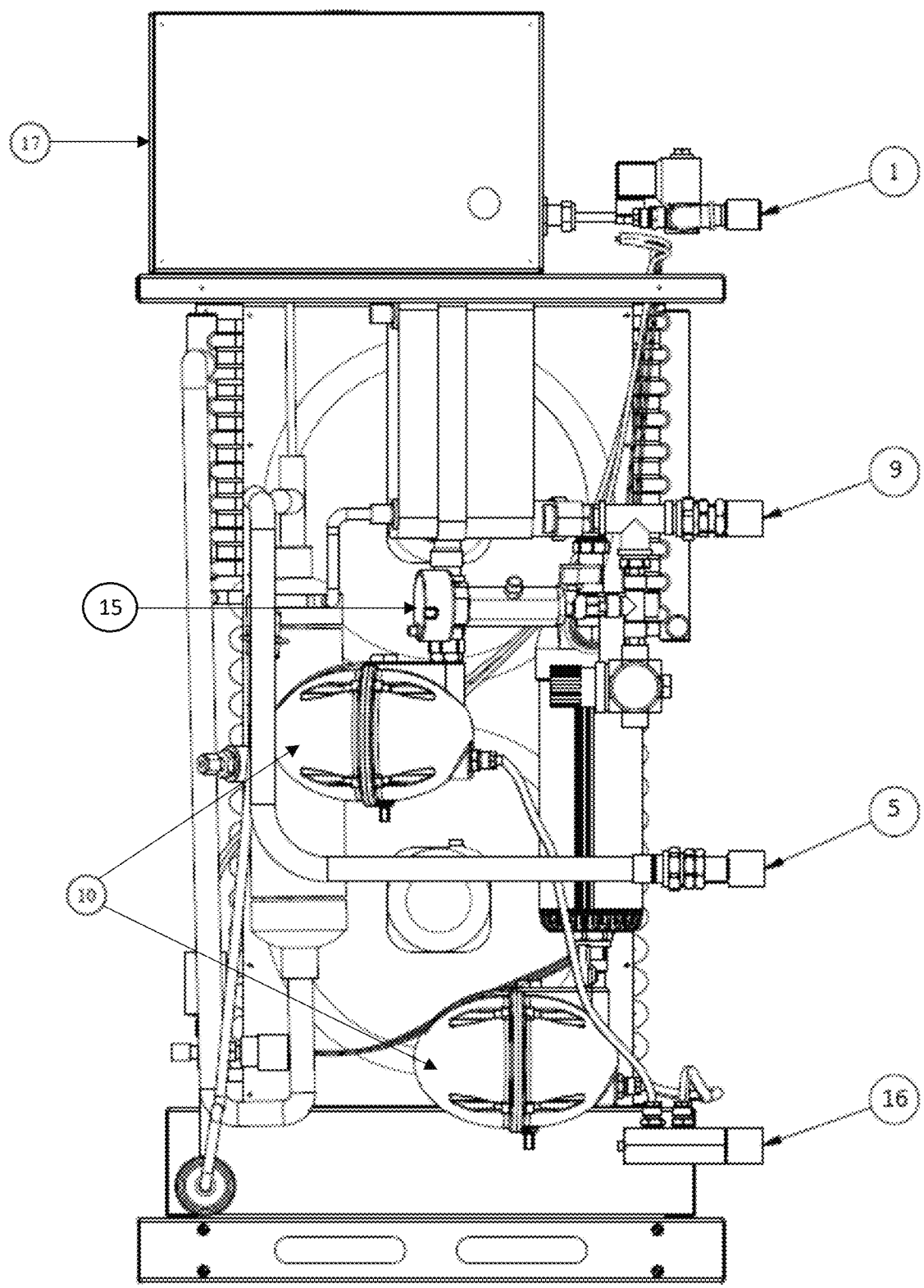
Figure 6:
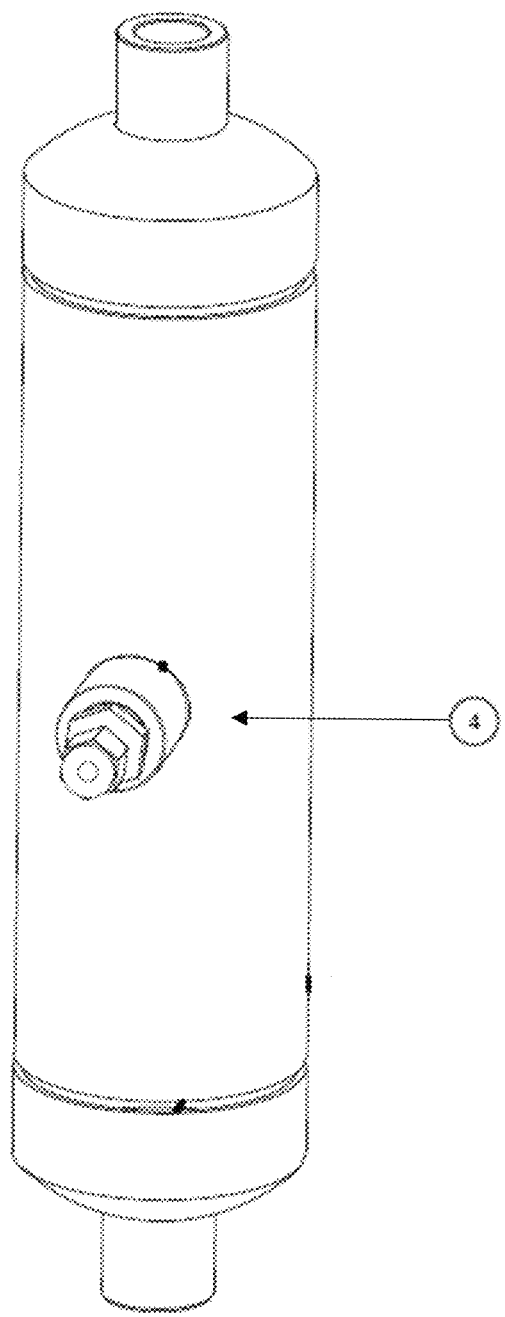

1. Hydrogen inlet port
2. Solenoid valve
3. Hydrogen flowmeter
4. Catalyst tank
5. Nitrogen inlet port
6. Expansion valve
7. Oxygen Analyzer
8. Exchanger
9. Nitrogen outlet port
10. Egg-shaped discharge member
11. Water separator
12. Eliminator filter dryer
13. First cooler
14. Regulator
15. Dew point analyzer
16. Discharge port
17. Control system panel
18. Compressor
19. Housing
20. Connection Cable
21. Condenser

The invention claimed is:

1. A system for nitrogen gas purification applications, the system comprising:
   - a nitrogen inlet port, which allows connection to a nitrogen generator to receive nitrogen gas,
   - a catalyst tank containing at least one catalyst, which allows eliminating of oxygen molecules in the nitrogen gas,
   - a hydrogen inlet port for the inlet of hydrogen gas into the catalyst tank,
   - at least one solenoid valve for controlling the flow of hydrogen gas entering the catalyst tank, and closing the inlet of hydrogen gas to the system,
   - a hydrogen flowmeter for monitoring the flow of hydrogen gas,
   - at least one proportional valve that allows passing of the hydrogen gas at a pre-determined flow rate,
   - a control unit for setting the pre-determined flow rate of the hydrogen gas and controlling a temperature of the hydrogen gas,
   - a first cooler (aftercooler) that condenses water therein by cooling nitrogen gas,
   - a water separator for separating the condensed water formed in the nitrogen gas, at least one discharge member and at least one discharge port for discharging the water separated by the water separator, a refrigerant-type dryer unit comprising an exchanger for heating and cooling the nitrogen gas, a compressor for compressing refrigerant gas and a thermostatic expansion valve for cooling a resulting condensed refrigerant fluid by reducing its-pressure of the resulting condensed refrigerant fluid, at least one temperature sensor for controlling a temperature of the system, a control system panel for controlling the system, and a nitrogen outlet port for releasing obtained nitrogen gas from the system.

2. The system according to claim 1, wherein the refrigerant-type dryer unit comprises a gas pressure regulator.

3. The system according to claim 1, wherein the refrigerant-type dryer unit comprises a condenser that allows cooling of compressed hot refrigerant gas.

4. The system according to claim 1, wherein the refrigerant-type dryer unit comprises an eliminator filter dryer for eliminating harmful particles in the resulting condensed refrigerant fluid.

5. The system according to claim 1, wherein the exchanger has a plate.

6. The system according to claim 5, wherein the plate is an aluminum plate.

7. The system according claim 1, wherein the control unit is a PID control unit.

8. The system according to claim 1, wherein the at least one discharge member comprises at least two egg-shaped discharge members.

9. The system according to claim 8, wherein the at least two egg-shaped discharge members are exactly two egg-shaped discharge members.

10. The system according to claim 1, wherein further comprising an oxygen analyzer for measuring purity of the nitrogen gas.

11. The system according to claim 1, wherein further comprising a dew point analyzer for measuring dryness of the nitrogen gas.

12. The system according to claim 1, wherein further comprising a housing surrounding the system.

13. The system according to claim 12, wherein the housing comprises a plurality of openings for the inlet and outlet of the nitrogen gas and the hydrogen gas.

14. The system according to claim 12, wherein at least two surfaces of the housing have a perforated structure for allowing air in and out of the system.

15. The system according to claim 12, wherein the control system panel is located on the housing.

16. The system according to claim 12, further comprising a connection cable on the housing that allows the flow of energy required to operate the system.

17. The system according to claim 1, wherein the at least one catalyst in the catalyst tank comprises a metal coating.

18. The system according to claim 17, wherein the metal coating is palladium.

19. A working method of a system according to claim 1, comprising:

sending nitrogen gas from the nitrogen generator into the catalyst tank, sending the hydrogen gas set at the pre-determined flow rate into the catalyst tank to react the hydrogen gas with oxygen in the nitrogen gas, cooling the nitrogen gas obtained at an outlet of the catalyst tank by sending the nitrogen gas to the first cooler (aftercooler), and condensing water contained in the nitrogen gas, separating, by the water separator, the resulting liquid water, discharging the water separated by the water separator, transmitting the nitrogen gas from the water separator to the exchanger, compressing the refrigerant gas by the compressor, cooling the compressed refrigerant gas by sending the compressed refrigerant gas to a condenser of the refrigerant-type dryer unit, eliminating particles by passing refrigerant fluid through an eliminator filter dryer, transmitting the refrigerant fluid passing through the eliminator filter dryer to the thermostatic expansion valve, and cooling the refrigerant fluid by reducing a pressure of the refrigerant fluid, transmitting the refrigerant fluid to the exchanger, condensing water contained in the pure nitrogen and turning the refrigerant fluid from liquid to gas form, and sending refrigerant gas to the compressor.

20. The method according to claim 19, wherein the nitrogen gas has 99.5% purity and contains 0.5% oxygen, wherein the pre-determined flow rate is such that an amount of the hydrogen gas is 1% of the nitrogen gas with which the hydrogen gas reacts.

21. The method according to claim 19, wherein the nitrogen generator is a PID nitrogen generator.

* * * * *